United States Patent
Scheim et al.

(10) Patent No.: US 10,363,889 B2
(45) Date of Patent: Jul. 30, 2019

(54) VEHICLE WIRELESS ELECTRICAL CONNECTION SYSTEM AND METHOD

(71) Applicant: GM GLOBAL TECHNOLOGY OPERATIONS LLC, Detroit, MI (US)

(72) Inventors: Kobi J. Scheim, Pardess Hanna (IL); Gregory M. Castillo, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/644,055

(22) Filed: Jul. 7, 2017

(65) Prior Publication Data

US 2019/0009738 A1    Jan. 10, 2019

(51) Int. Cl.
  *H04B 5/00*    (2006.01)
  *B60R 16/023*  (2006.01)
  *B60R 16/03*   (2006.01)

(52) U.S. Cl.
  CPC ............ *B60R 16/023* (2013.01); *B60R 16/03* (2013.01); *H04B 5/0037* (2013.01); *H04B 5/0081* (2013.01)

(58) Field of Classification Search
  CPC ......... B60R 16/03; B60R 16/023; H04B 5/00; H04B 5/0012; H04B 5/0031; H04B 5/0037; H04B 5/0075; H04B 5/0081; H01Q 1/24; H01R 31/065
  See application file for complete search history.

(56) References Cited

U.S. PATENT DOCUMENTS

| | | |
|---|---|---|
| 4,852,901 A | 8/1989 | Beasley et al. |
| 7,108,754 B2 | 9/2006 | Franco |
| 7,304,443 B2 | 12/2007 | Argo |
| 7,574,769 B1 | 8/2009 | Nemeth |
| 8,888,121 B2 | 11/2014 | Trevino et al. |
| 9,368,033 B2 | 6/2016 | Reilhac |
| 9,466,988 B2* | 10/2016 | Deyaf .................. H04B 5/0037 |
| 9,852,843 B2* | 12/2017 | Davis .................. H04B 5/0075 |
| 10,164,392 B1* | 12/2018 | Scheim ............... H01R 31/065 |
| 2008/0100137 A1 | 5/2008 | Kwon |
| 2009/0216402 A1 | 8/2009 | Kwon |
| 2009/0248243 A1 | 10/2009 | Kwon |

(Continued)

OTHER PUBLICATIONS

USPTO, Final Office Action issued in U.S. Appl. No. 15/626,543, dated Aug. 16, 2018.

(Continued)

*Primary Examiner* — Thanh C Le
(74) *Attorney, Agent, or Firm* — Lorenz & Kopf, LLP

(57) ABSTRACT

A wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal. A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver.

10 Claims, 3 Drawing Sheets

(56) References Cited

U.S. PATENT DOCUMENTS

| | | |
|---|---|---|
| 2011/0197381 A1 | 8/2011 | Nelson |
| 2011/0197387 A1 | 8/2011 | Nelson |
| 2012/0024081 A1 | 2/2012 | Baker |
| 2012/0032632 A1* | 2/2012 | Soar ........................ H02J 50/40 320/108 |
| 2013/0020879 A1* | 1/2013 | Kihara ................. H04B 5/0037 307/104 |
| 2013/0124011 A1 | 5/2013 | Kwon |
| 2015/0003569 A1* | 1/2015 | Ji ......................... H04B 5/0037 375/340 |
| 2015/0151714 A1 | 6/2015 | Kamiya |
| 2015/0251584 A1 | 9/2015 | Deyaf |
| 2016/0014206 A1 | 1/2016 | Isobe |
| 2016/0272161 A1 | 9/2016 | Berry |
| 2018/0241134 A1* | 8/2018 | Kang ...................... H01Q 1/24 |

OTHER PUBLICATIONS

USPTO, Notice of Allowance issued in U.S. Appl. No. 15/632,770, dated Sep. 24, 2018.
USPTO, Non-Final Office Action issued in U.S. Appl. No. 15/340,639, dated May 1, 2019.

* cited by examiner

VEHICLE WIRELESS ELECTRICAL CONNECTION SYSTEM AND METHOD

TECHNICAL FIELD

This patent generally relates to electrically powered systems for a vehicle, and more particularly, this patent relates to wirelessly powered and controlled electrical devices and systems and methods of wirelessly powering such devices and systems.

BACKGROUND

Road vehicles are typically equipped with one or more electrical devices or systems that are mounted on or near enclosing transparent panels, such as the windshield and rear glass or backlite of the vehicle. One example is the interior rear view mirror to assist the vehicle operator that may be mounted on or in close proximity to an upper center portion of the windshield. Interior mirror systems may include in addition to a reflecting surface: lights, auto-dimming functionality, a communication interface and, possibly, an integrated display, such as a light emitting diode (LED), a liquid crystal display (LCD) and similar type display. Another example is the center high-mounted stop lamp (CHMSL) that is frequently mounted on or near the upper center portion of the roof or backlite of the vehicle.

In existing implementations, a direct electrical and data signal connection is provided by a wiring harness from the vehicle body to these devices and systems. The need to provide electric power and possible data communications to these devices and systems complicates the design/packaging and installation processes. In the particular case of the CHMSL, providing a wiring harness connection may further be complicated by having to connect from the vehicle interior to the vehicle exterior across a wet surface boundary that require appropriate sealing, such as by grommets and the like, as well as providing apertures in one or more body panels to receive a CHMSL assembly. In each case, providing an electric power and data signal wiring connection to the mirror system and/or CHMSL and other similar disposed electrical devices and systems within the vehicle can result in less than optimal results in certain situations.

Accordingly, it is desirable to provide an electrical power and data system interconnection that simplifies the connection of a device or system to the vehicle electrical and controller systems. It is further desirable to provide vehicles incorporating such electrical device and system interconnections. Furthermore, other desirable features and characteristics of the present disclosure will become apparent from the subsequent detailed description and the appended claims, taken in conjunction with the accompanying drawings and the foregoing technical field and background.

SUMMARY

A wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal. A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver.

In another non-limiting exemplary embodiment, a wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal. A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver.

In another non-limiting exemplary embodiment, a wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal. A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver. The link may be a conductor operatively electrically joining the first coil and the second coil.

In another non-limiting exemplary embodiment, a wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal. A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver. The first transceiver and the second transceiver are operable to communicate data with the wireless electric power signal.

In another non-limiting exemplary embodiment, a wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal. A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver. The first transceiver includes a first processor and the second transceiver includes a second processor, wherein the first and second processors are operable to communicate data via the first and second transceivers In another non-limiting exemplary embodiment, a wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal. A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver. The electrically powered device may be a mirror assembly or a lamp assembly.

In another non-limiting exemplary embodiment, a wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal. A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver. The link is disposed on a windshield or a backlite of the vehicle.

In another non-limiting exemplary embodiment, a wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal. A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver. The link is a printed conductive material.

In another non-limiting example, a wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal. A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver.

In another non-limiting example, a wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal. A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver. The link may be a conductor operatively electrically joining the first coil and the second coil.

In another non-limiting example, a wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal. A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver. The first transceiver and the second transceiver operable to communicate data with the wireless electric power signal.

In another non-limiting example, a wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal. A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver. The first transceiver including a first processor and the second transceiver including a second processor, wherein the first and second processors are operable to communicate data via the first and second transceivers.

In another non-limiting example, a wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal. A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver. The electrically powered device may be a mirror assembly or a lamp assembly.

In another non-limiting example, a wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal.

A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver. The link may be disposed on a windshield or a backlite of the vehicle.

In another non-limiting example, a wireless electrical device interconnect system for a vehicle includes an electrically powered device adapted to be disposed on an interior or exterior surface of the vehicle. A first transceiver is operable to provide a wireless electric power signal, and a second transceiver is operably coupled to the electrically powered device to provide energizing electric power to the electrically powered device to energize the electrically powered service responsive to the wireless electric power signal. A conductive link has a first coil and a second coil. The first coil is disposed adjacent the first transceiver to couple the wireless electric power signal from the first transceiver to the link, and the second coil is disposed adjacent the second transceiver to couple the wireless electric power signal from the link to the second transceiver. The link may be a printed conductive material.

In another non-limiting example, a method of electrically coupling an electrically powered system or device to a vehicle is provided. The method includes providing a first transceiver disposed on a body portion of the vehicle, and providing a second transceiver operatively coupled to the electrically powered system or device. A link is provided between the first transceiver and the second transceiver. A power signal is wirelessly communicated from the first transceiver to the link and from the link to the second transceiver to energize the electrically powered system or device.

In another non-limiting example, a method of electrically coupling an electrically powered system or device to a vehicle is provided. The method includes providing a first transceiver disposed on a body portion of the vehicle, and providing a second transceiver operatively coupled to the electrically powered system or device. A link is provided between the first transceiver and the second transceiver. A power signal is wirelessly communicated from the first transceiver to the link and from the link to the second transceiver to energize the electrically powered system or device. The method may further include communicating a data signal in conjunction with the power signal.

In another non-limiting example, a method of electrically coupling an electrically powered system or device to a vehicle is provided. The method includes providing a first transceiver disposed on a body portion of the vehicle, and providing a second transceiver operatively coupled to the electrically powered system or device. A link is provided between the first transceiver and the second transceiver. A power signal is wirelessly communicated from the first transceiver to the link and from the link to the second transceiver to energize the electrically powered system or device. Providing the link may include providing the link being on a windshield or a backlite of the vehicle.

In another non-limiting example, a method of electrically coupling an electrically powered system or device to a vehicle is provided. The method includes providing a first transceiver disposed on a body portion of the vehicle, and providing a second transceiver operatively coupled to the electrically powered system or device. A link is provided between the first transceiver and the second transceiver. A power signal is wirelessly communicated from the first transceiver to the link and from the link to the second transceiver to energize the electrically powered system or device. Providing the link may include providing the link as a printed conductive material.

In another non-limiting example, a method of electrically coupling an electrically powered system or device to a vehicle is provided. The method includes providing a first transceiver disposed on a body portion of the vehicle, and providing a second transceiver operatively coupled to the electrically powered system or device. A link is provided between the first transceiver and the second transceiver. A power signal is wirelessly communicated from the first transceiver to the link and from the link to the second transceiver to energize the electrically powered system or device. The electrically powered system or device may be secured to the windshield or the backlite.

In another non-limiting example, a method of electrically coupling an electrically powered system or device to a vehicle is provided. The method includes providing a first transceiver disposed on a body portion of the vehicle, and providing a second transceiver operatively coupled to the electrically powered system or device. A link is provided between the first transceiver and the second transceiver. A power signal is wirelessly communicated from the first transceiver to the link and from the link to the second transceiver to energize the electrically powered system or device. The method may further include securing the first transceiver to a body portion of the vehicle and securing the second transceiver to the electrically powered system or device.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
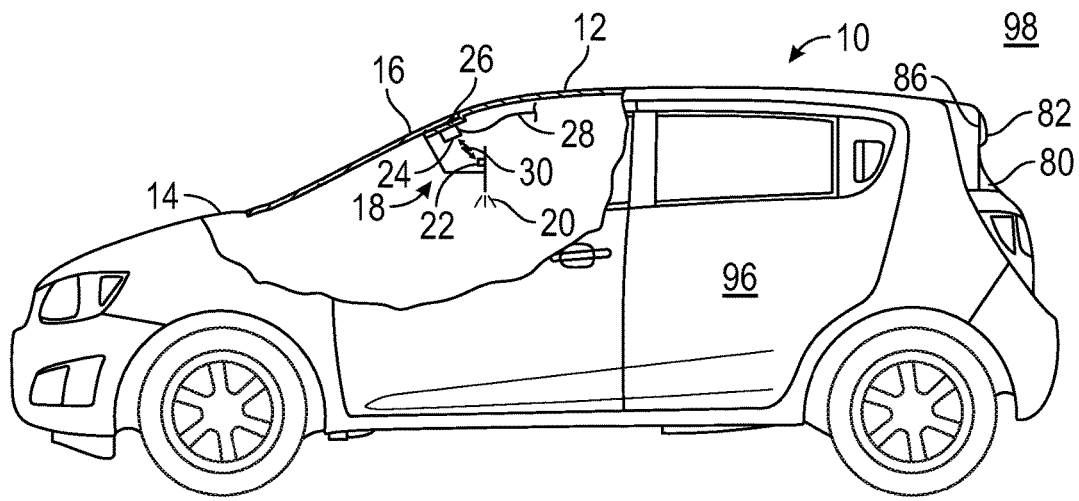
FIG. 1 is a block diagram illustration of a mirror system of a vehicle in accordance with the herein described embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term system or module may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group), memory that executes one or more software or firmware programs, a combinational logic circuit, and/or other suitable components that provide the described functionality.

Embodiments may be described herein in terms of functional and/or logical block components and various processing steps. It should be appreciated that such block components may be realized by any number, combination or collection of mechanical and electrical hardware, software, and/or firmware components configured to perform the specified functions. For example, a described embodiment may employ various combinations of mechanical components, e.g., mountings, body components and glass; and electrical components, integrated circuit components, memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of mechanical and/or electronic systems, and that the vehicle systems described herein are merely exemplary embodiments.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a described embodiment.

Referring to FIG. 1 a vehicle 10 has a body portion 12 within which is fixed a windshield 14. The windshield may be constructed of glass, polycarbonate, or any suitable optically transparent material. Mounted to the body portion 12 or to the windshield 14, at a position proximate the upper center portion 16 of the windshield 14 is a mirror assembly 18. As depicted in FIG. 1, the mirror assembly 18 is mounted to a header portion 26 of the body portion 12 in a known manner. The mirror assembly 18 includes one or more electrically powered functionalities, and an interior light 20 is depicted as one example. Without limiting the generality of an electrically powered functionality, other examples include a communication interface; an integrated display, such as a light emitting diode (LED) or liquid crystal display (LCD) display; automatic dimming; automatic adjustment; and the like. To enable the electrically powered functionality, the mirror assembly 18 requires at least a source of electric power, and as appropriate, data communication capability.

To provide an electrical connection between the mirror assembly 18 and a source of electric power and/or one or more data communication devices and controllers (not depicted) disposed in the body portion 12, the mirror assembly 18 includes a wireless transceiver 22 that is coupled to the mirror assembly via power, ground and signal connections (not depicted). The transceiver 22 may be made integral with the mirror assembly 18, contained within a common housing or enclosure as the mirror assembly 18 or may be a separate component or module that is secured to the mirror assembly 18. Upon excitation of the transceiver 22, it is operable at least to supply electric power to the mirror assembly 18, and in various implementations in accordance with the herein described embodiments, to communicate data to and from the mirror assembly 18 to data communication devices and/or controllers (not depicted) disposed within the vehicle 10.

In the exemplary embodiment depicted in FIG. 1, a transceiver 24 that is complimentary to the transceiver 22 is secured to a header portion 26 of the body portion 12. The transceiver 24 is provided with power, ground and signal connections via a wire harness 28 routed along the header portion 26. The wire harness 28 connects the transceiver 24 to a source of electric power and to data sources and/or controllers (not depicted) disposed within the vehicle 10. The transceiver 24 may be secured to the header portion 26 using mechanical fasteners (threaded, rivets, clips and the like), bonding, or by any suitable means. The mirror assembly 18 implementation depicted in FIG. 1 provides a wireless interface 30, via transceivers 22 and 24, to provide wireless communication of power and data, such as control signals, between the body portion 12 and the mirror assembly 18 without a wire connection from the body portion 12 to the mirror assembly 18, advantageously eliminating the need for a wire connection from the header portion 26 to the mirror assembly 18.

The transceivers 22 and 24 are arranged to be disposed in close proximity to one another to permit wireless capacitive coupling (electrostatic induction) between metal electrodes (not depicted), or inductive coupling (electromagnetic induction, also known as magnetic resonance coupling—MRC) between coils of wire (not depicted) disposed respectively within the transceivers 22 and 24. In this manner, motive electrical power may be communicated from the transceiver 24 to the transceiver 22 to energize the electrical functionalities within the mirror assembly 18. The arrangement of transceivers 22 and 24 may be essentially open loop, in that transceiver 24 when energized couples power to transceiver 22 energizing the mirror assembly 18, but without communicating data. This would allow energizing of the mirror assembly 18 to make operable such electrical functionalities as light 20 or automatic dimming. Alternatively, the transceivers 22 and 24 may be configured to communicate one or more data associated with electrical functionalities such as activation and control signals of a communication interface or image data to be displayed upon an integrated display (i.e. closed loop or a scheme having control feedback).

Figure 2:
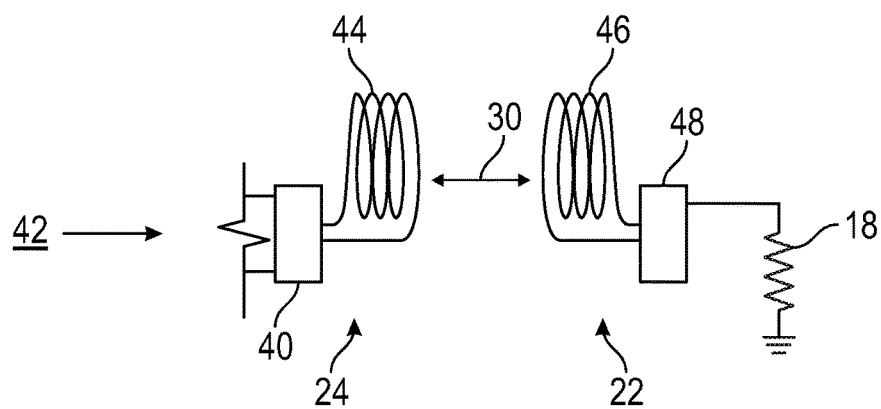
FIG. 2 is a schematic circuit diagram of a wireless transmitter/receiver that may be used in an electric interconnection system in accordance with the herein described embodiments.

FIG. 2 depicts an exemplary arrangement of transceivers 22 and 24 utilizing inductive coupling. Transceiver 24 includes a signal generator 40 that is responsive to an input signal 42 to couple a driving signal to a primary coil 44. Transceiver 22 includes a secondary coil 46 that couples to a transformer/rectifier 48 that is coupled to provide electric power to a load 50, for example, the mirror assembly 18.

In one exemplary implementation, the coupling may be done on the magnetic plane at a suitable frequency, and for example at a frequency of 13.56 Mhz. To communicate a small number of bits of data from the transceiver 24 to the transceiver 22, a phase of the input signal 42 may be shifted. The phase shifts are detected by the transceiver 22 as bits of data (i.e. 'forward signaling' from primary to secondary coil). On the other way, within the transceiver 24, the load impedance may be shifted. The load impedance shift may be detected within the transceiver 22, for example as a phase shift reflection in the primary coil 44, effectively providing an ability to communicate bits of data (i.e. 'backward signaling' from the secondary to the primary coil).

Figure 3:
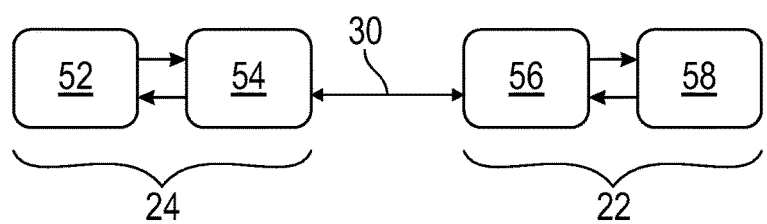
FIG. 3 is a functional block diagram of a wireless transmitter/receiver that may be used in an electric interconnection system in accordance with the herein described embodiments.

The functional block diagram arrangement depicted in FIG. 3 of transceivers 22 and 24 further illustrate how the transceivers 22 and 24 may be arranged to communicate data in excess of a small number of bits, such as control signals and data between data sources and/or controllers disposed within the body portion 12 and the mirror assembly 18.

As depicted in the exemplary embodiments, the transceiver 24 may be configured to include a signal processor 52 operatively coupled to a transmit/receive element 54 that would include operatively coupled a coil a transformer and a signal generator/signal detector (not depicted). The transceiver 22 may similarly be configured to include a transmit/receive element 56 that would include a coil operatively coupled to a signal detector/generator and transformer (not depicted) coupled to a signal processor 58.

In operation in accordance with the exemplary embodiments, the signal processor 52, responsive to receipt of data from a data source and/or controller disposed, for example within the body portion 12, may generate one or more data signals to be communicated from the body portion 12 to the mirror assembly 18. The data signals may be modulated onto a carrier signal communicated wirelessly from the element 54 to the element 56, and the data signals may be decoded by the signal processor 58. The data signals may be modulated as complex data within the carrier signal using a suitable keying method, or may be modulated as serial bits of data communicated as phase shifted signals as discussed above. Likewise, the signal processor 58 may generate one or more data to be communicated from the mirror assembly 18 to the body portion 12.

Figure 4:
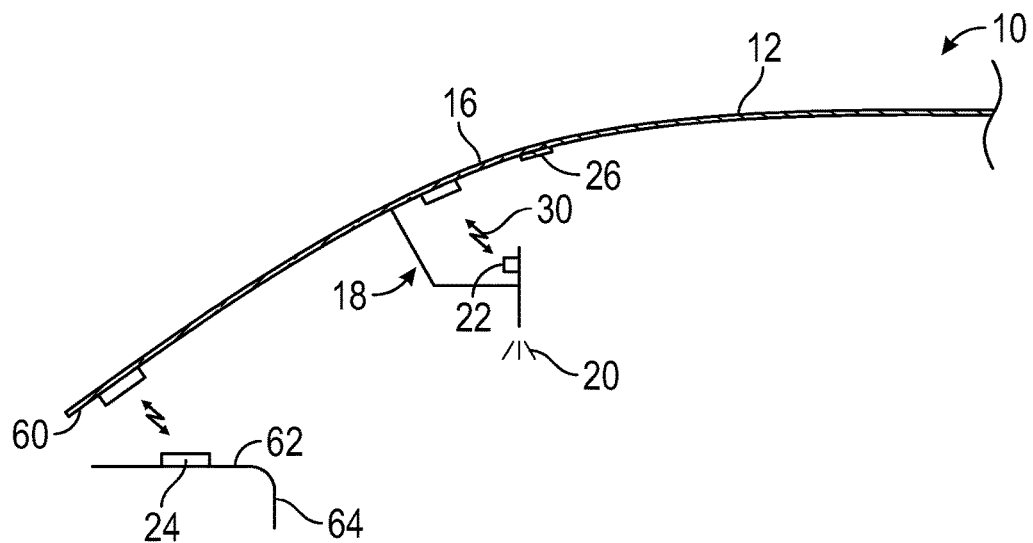
FIG. 4 is a schematic illustration of a mirror system of a vehicle in accordance with another of the herein described embodiments.
Figure 5:
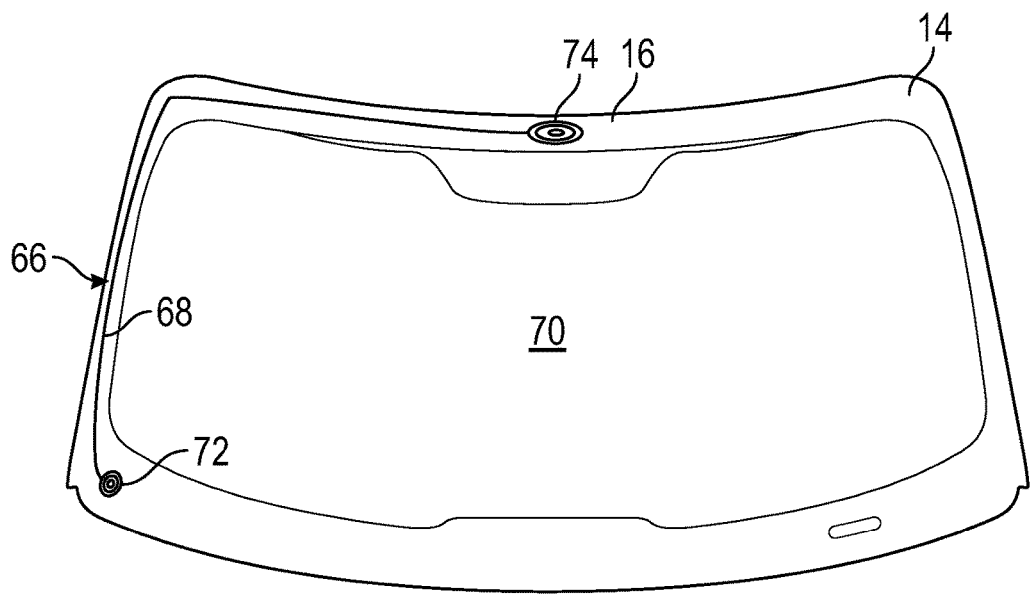
FIG. 5 is a graphic depiction of a windshield of a vehicle in accordance with the herein described embodiments.

Referring to FIGS. 4 and 5, an alternative exemplary embodiment of an electrical interconnection system for mirror assembly 18 is shown that advantageously eliminates the wire harness 28, and hence, the need to provide wire harness 28 and the complexity of routing wire harness 28 to the header portion 26. The mirror assembly 18 in FIG. 4 is depicted secured in a known manner to the windshield 14, although it may be secured to the header portion 26 as depicted in the embodiment of FIG. 1.

The transceiver 24 is disposed within the body portion 12 at a location on or near a lower, edge portion 60 of the windshield 14, and for example, on a surface 62 of an instrument panel 64 or on a lower portion of an A-pillar (not depicted). As shown best in FIG. 5, a link 66 is disposed on the windshield 14 and facilitates electrical coupling of the transceiver 24 to the transceiver 22. The link 66 may be a conductor 68 disposed on a surface 70 of the windshield 14. The conductor 68 may be a wire or wires bonded to the surface 70. In an exemplary embodiment, the conductor 68 is printed on the surface 70. In such an embodiment, the conductor 68 may be printed using a printable conductive material, such as a conductive polymer. In another embodiment, the conductor may reside inside the windshield and embedded there as part of the windshield production process.

The link 66 includes a first coil 72 and a second coil 74, and conductor 68 is disposed between and electrically couples the coil 72 and the coil 74. The coil 72 is disposed adjacent to the transceiver 24 permitting inductive coupling between the coil 72 and the transceiver 24. The coil 74 is disposed adjacent the transceiver 22 permitting inductive coupling between the coil 74 and the transceiver 22. Thus, the link 66 provides electrical coupling between the transceivers 22 and 24. Moreover, as the link 66 is disposed on the windshield 14 eliminating the requirement to provide the wire harness 28.

Figure 6:
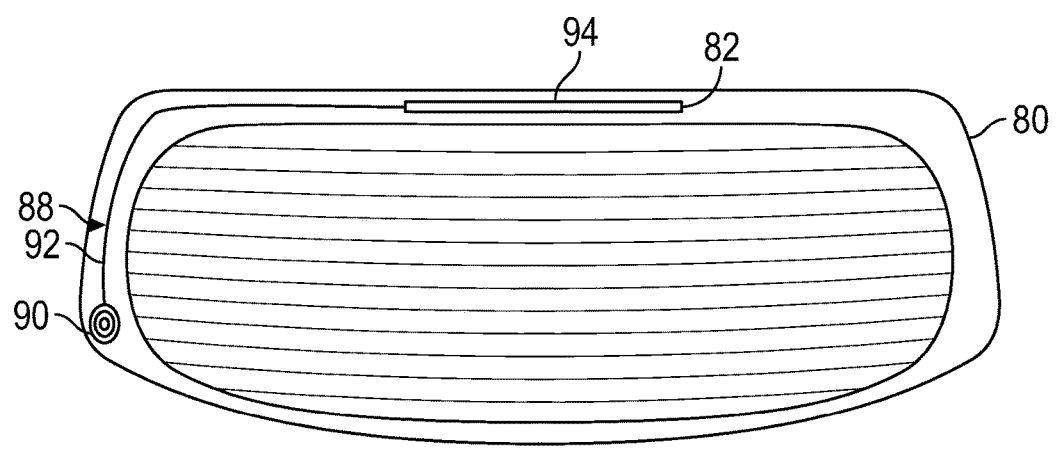
FIG. 6 is a graphic depiction of a backlite and center high-mounted stop lamp (CHMSL) assembly of a vehicle in accordance with the herein described embodiments.
Figure 7:
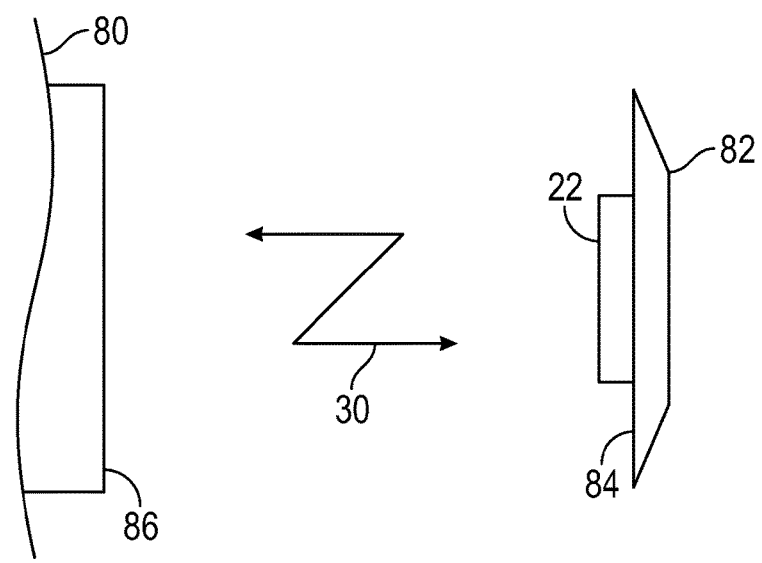
FIG. 7 is a graphic sideview depiction of a backlite and CHMSL assembly of a vehicle in accordance with the herein described embodiments.

With reference again to FIG. 1 and also with reference to FIGS. 6 and 7 there is depicted yet a further exemplary embodiment of a backlite 80 having disposed thereon or formed therein a center high-mounted stop lamp (CHMSL) 82. The backlite 80 encloses a rear body opening (not depicted) separating an interior 94 of the vehicle 10 from the exterior 96. The exterior 96 of the vehicle 10 may be exposed to harsh weather conditions, including rain, ice, snow, dirt and the like. As shown in FIG. 7, the CHMSL 82 may be secured to the backlite 80 by bonding. Transceiver 22 is disposed on a surface 84 of the CHMSL 82 such that when bonded to the backlite 80, the transceiver 22 is adjacent the backlite 80 and a coil 86 formed as part of a link 88 disposed on the backlite 80.

The link 88 further includes a coil 90 and a conductor 92 joining the coil 86 and the coil 90. A transceiver (not depicted) such as transceiver 24 is disposed within the interior 96 of the body portion 12 positioned adjacent to the coil. 90. In this way, the link 88 effectively couples the transceivers 22 and 24, such that energizing electric power and potentially data signals may be communicated to the CHMSL 82.

As will be appreciated, alternatively, the transceiver 24 may be positioned on the backlite 80 or on a body portion corresponding to the upper center portion 94 of the backlite 80 (FIG. 6) such that mounting of the CHMSL 82 to the backlite 80 positions the transceiver 22 adjacent the transceiver 24.

Advantageously, providing electric power and data signals to a CHMSL, such as CHMSL 82, which may be made integral with or bonded to a backlite, such as backlite 80, allows the CHMSL 82 to be first made as a sealed assembly. This reduces the possibility of water or other contaminants entering the CHMSL 82 by virtue of being disposed on the exterior 98, which may effect its operation or long term reliability. Additionally, apertures in the body portion of the vehicle are eliminated. Providing electric power and data signals via wireless transmission and a link element, simplifies or eliminates various wire connections, including without limitations a wire harness connection to the CHMSL routed along a header portion of the vehicle.

Yet additional advantages arise with the use of a wireless coupling of electrical systems and devices to the vehicle electrical power sources, data sources and controllers. For example, installation processes may be improved, as the body-side transceiver can be installed prior to installation of the electrical system or device allowing for a hidden connection, helping to reduce the number of wires and wire harness, and preventing damage to the wiring and improving initial product quality and long term reliability.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A wireless electrical device interconnect system for a vehicle, the being vehicle provided with a windshield or a backlite having a first surface, the vehicle comprising:
an electrically powered device adapted to be disposed on an interior or exterior surface of the vehicle;
a first transceiver operable to provide a wireless electric power signal;
a second transceiver coupled to the electrically powered device to provide electric power to the electrically powered device to energize the electrically powered service responsive to the wireless electric power signal;
a conductive link having a first coil and a second coil, the conductive link and the first and second coils being disposed on the first surface, the first coil being disposed adjacent the first transceiver to couple the wireless electric power signal from the first transceiver to the conductive link, and the second coil being disposed adjacent the second transceiver to couple the wireless electric power signal from the link to the second transceiver and wherein,
the first coil is disposed on the first surface adjacent the first transceiver, the second coil is disposed on the first surface adjacent the second transceiver, the first transceiver is remote from the second transceiver and the link is a conductor disposed on the surface operatively electrically joining the first coil and the second coil.

2. The system of claim 1, the first transceiver and the second transceiver operable to communicate data with the wireless electric power signal.

3. The system of claim 1, the first transceiver including a first processor and the second transceiver including a second processor, wherein the first and second processors are operable to communicate data via the first and second transceivers.

4. The system of claim 1, wherein the electrically powered device comprises a mirror assembly or a lamp assembly.

5. The system of claim 1, the conductive link being a printed conductive material.

6. A wireless electrical device interconnect system for a vehicle having a body portion having an interior and an exterior and at least one electrically powered system or device adapted to be disposed on a first surface of the exterior or the interior, the vehicle further provided with a windshield or a backlite having a second surface, the system comprising:
a first transceiver operable to provide a wireless electric power signal;
a second transceiver coupled to the electrically powered device to provide energizing electric power to the electrically powered device to energize the electrically powered service responsive to the wireless electric power signal;
a conductive link having a first coil and a second coil disposed on the second surface, the first coil being disposed adjacent the first transceiver to couple the wireless electric power signal from the first transceiver to the conductive link, and the second coil being disposed adjacent the second transceiver to couple the wireless electric power signal from the link to the second transceiver, and wherein,
the first coil is disposed on the second surface adjacent the first transceiver, the second coil is disposed on the second surface adjacent the second transceiver, the first transceiver is remote from the second transceiver and the link is a conductor disposed on the surface operatively electrically joining the first coil and the second coil.

7. The system of claim 6, the first transceiver and the second transceiver operable to communicate data with the wireless electric power signal.

8. The system of claim 6, the first transceiver including a first processor and the second transceiver including a second processor, wherein the first and second processors are operable to communicate data via the first and second transceivers.

9. The system of claim 6, wherein the electrically powered device comprises a mirror assembly or a lamp assembly.

10. The system of claim 6, the conductive link being a printed conductive material.

* * * * *